UNITED STATES PATENT OFFICE.

FREDERICK SUPF, OF NEW YORK, N. Y., ASSIGNOR TO THE ARABOL MANUFACTURING COMPANY, OF NEW YORK, N. Y., A CORPORATION OF NEW YORK.

PROCESS OF TREATING STARCH.

No. 918,925.          Specification of Letters Patent.          Patented April 20, 1909.

Application filed June 27, 1908. Serial No. 440,680.

*To all whom it may concern:*

Be it known that I, FREDERICK SUPF, a subject of the Emperor of Germany, and a resident of New York, in the county of New York and State of New York, have invented certain new and useful Improvements in Processes of Treating Starch, of which the following is a specification.

My invention relates to improvements in processes for treating starch; and it has for its object to render starch capable of swelling in cold water to a viscous mass, viz.—to attain with cold water the same result as is ordinarily attained in cooking up starch with hot water. I am aware that various processes are known for producing a starch of this character, said processes depending upon the destructive effect of caustic alkalies upon the layers of the starch granules, normally unaffected by cold water. In order to prevent the swelling starch substance from forming a homogeneous tough mass with the water of the lye, the caustic alkalies have been dissolved in liquids such as alcohol or concentrated salt solutions which permit the caustic alkalies to act, but prevent the swelling starch from uniting to a homogeneous mass. (See U. S. Patent No. 785,216 and German Patents Nos. 157,896; 166,259). Or, before allowing the caustic alkali to act thereon, the starch has been suspended in a water repellent medium, for example—hydrocarbons, carbon tetrachlorid etc. (See U. S. Patents Nos. 847,658 and 847,985). All these processes, in order to produce a commercial product, require, that the swollen and exceedingly voluminous mass be neutralized, which neutralization, however, results in a salt impregnated starch. If acid such as acetic, sulfuric, hydrochloric, nitric etc., which as a rule form hygroscopic salts, be employed for such neutralization, the undesirable hygroscopic property is also assumed by the starch mass. In order to avoid this difficult and objectionable process of neutralization and to obtain a cold swelling starch free from all salts, I have sought in the present process a reagent acting on starch similarly to the caustic alkalies, neutral in itself and which could be readily and completely removed from the starch mass. In the salts of sulfocyanic acid, such as ammonium or potassium sulfocyanate, I have found these desirable properties. These salts have also the further valuable properties of being practically completely recoverable by washing out with a suitable solvent such as alcohol, acetone etc., which dissolves the same without allowing the starch to flow together to a homogeneous mass. The result of this process is, that without causing starch to flow together to form a homogeneous mass, the layers of the starch normally unaffected by cold water, are so altered as to no longer protect the starch from swelling therein. Being less active in their chemical behavior toward starch than the caustic alkalies, the sulfocyanates are applicable dissolved simply in water and without any additions, provided the proper concentration, temperature and quantity of the solution are maintained. The activity of the sulfocyanic acid salts may be further controlled by the addition of reagents which weaken or hinder the swelling property of the starch, for example,—salt solutions, and all organic solvents miscible with water such as alcohol, acetone etc. The starch may also be suspended in hydrocarbons, carbon tetrachlorid, etc.

In carrying out my process I take, for example, 100 parts by weight of pulverized dry starch such as ordinary potato starch, and treat this with 80 parts of a 50% solution of ammonium sulfocyanate in water and to which have been added 40 parts of alcohol, and thoroughly mix the starch and solution by stirring. A small amount of sodium sulfite may be employed to prevent discoloration due to slight quantities of iron sometimes present as an impurity. The salt is then washed out with alcohol, acetone etc., which, as well as the salt, is in a technical sense quantitatively recoverable, so that all the reagents employed in the process may be reëmployed without appreciable loss. The resulting product is in a technical sense a pure starch which possesses the valuable property of swelling in cold water to a homogeneous mass such as formerly was obtained only through boiling. This product further possesses, at ordinary temperatures, so far as it has been possible to examine the same, all the properties which starch as a rule possesses only after becoming pasty through the action of higher temperatures. It may for example, through the action of diastase or of acids, be converted at ordinary temperature. Also, the solutions of all of the other reagents such as calcium and magnesium chlorid, borax, sulfonates, and soluble oils and fats act on the starch in the cold state in the same manner as upon the boiled starch. The specific character of the starch treated according to the process herein set forth is not altered, so that thick cooking opaque starches will make a thick opaque paste, transparent starches a transparent paste, etc.

I claim:—

1. The herein described process for rendering starch capable of swelling in cold water, consisting in treating the starch with a solution of a suitable sulfocyanate.

2. The herein described process for rendering starch capable of swelling in cold water, consisting in treating the starch with a solution of ammonium sulfocyanate.

3. The herein described process for rendering starch capable of swelling in cold water, consisting in treating by weight—100 parts of pulverized, dry potato starch with 80 parts of a 50% solution of ammonium sulfocyanate in water to which have been added 40 parts of alcohol.

4. The herein described process for rendering starch capable of swelling in cold water, consisting in treating the starch with a suitable solution of a sulfocyanate, and then washing the same with a suitable solvent.

5. The herein described process for rendering starch capable of swelling in cold water, consisting in treating starch with a suitable solution of a sulfocyanate and to which alcohol has been added, and then washing the same with alcohol until the salt has been removed.

Signed at New York in the county of New York and State of New York this 25th day of June A. D. 1908.

FREDERICK SUPF.

Witnesses:
FREDERICK D. UTTLEY,
A. F. VOIGT.